July 13, 1965 E. J. CAPISTRANT ETAL 3,193,880
TIRE RETREADING MOLD AND LIFTING MEANS THEREFOR
Filed Dec. 28, 1962
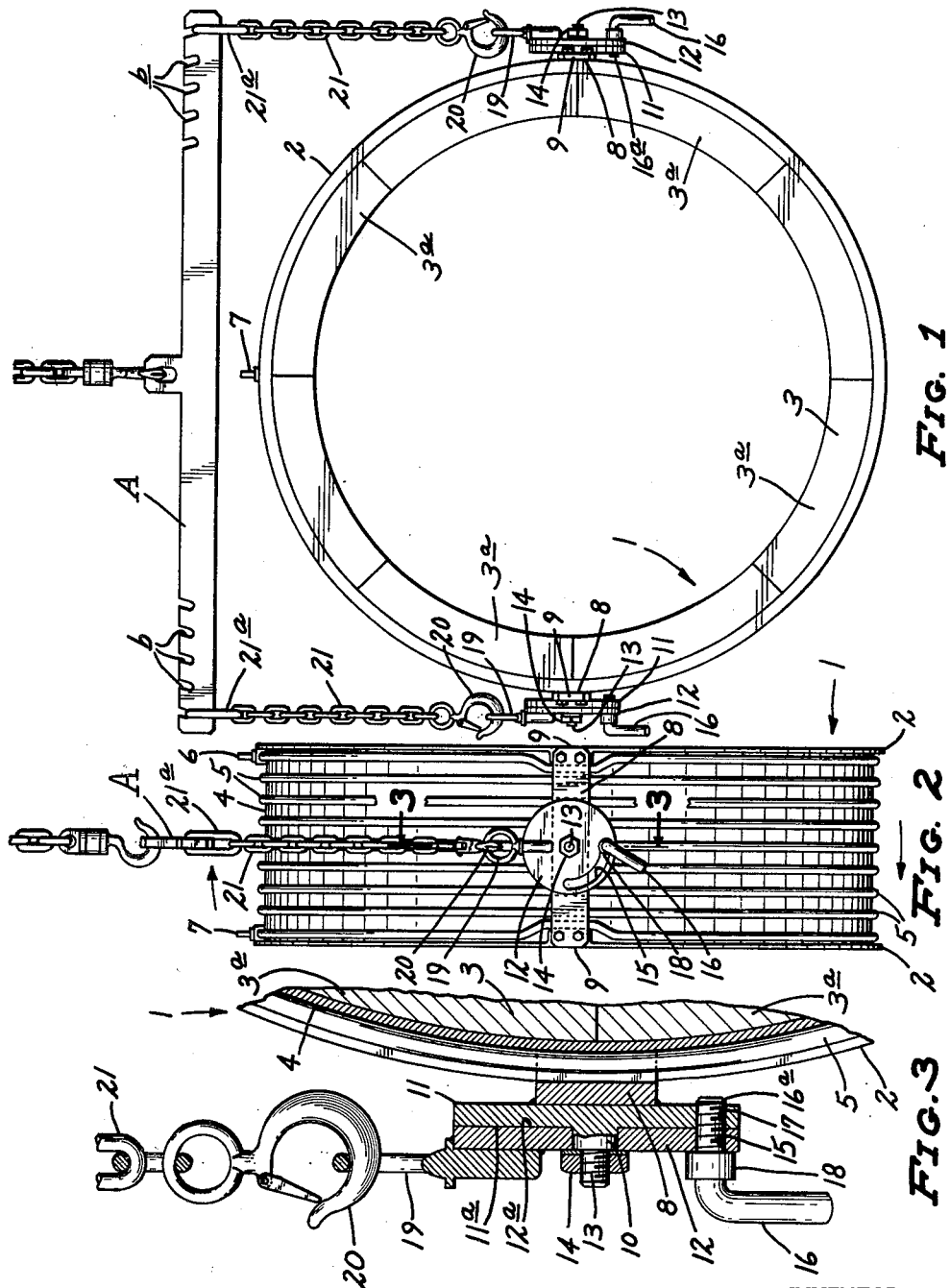
INVENTOR.
EUGENE J. CAPISTRANT
RUDOLPH E. OLSON
BY
Merchants, Merchants & Gould
ATTORNEYS United States Patent Office 3,193,880
Patented July 13, 1965

3,193,880
TIRE RETREADING MOLD AND LIFTING
MEANS THEREFOR
Eugene J. Capistrant and Rudolph E. Olson, Minneapolis, Minn., assignors to Paul E. Hawkinson Company, Minneapolis, Minn., a corporation of Minnesota
Filed Dec. 28, 1962, Ser. No. 248,014
2 Claims. (Cl. 18—18)

Our invention relates to improvements in pneumatic tire retreading molds and more particularly to improvements in molds of the so-called "band" type.

Still more specifically, our invention relates to novel means whereby relatively heavy band-type tire retreading molds may be lifted for purposes of transporting same to and from storage racks, curing presses, and the like.

A further object of our invention is to the provision of a tire retreading mold of the class above described which is provided with means for lifting same while either in a vertical or horizontal position.

A still further object of our invention is the provision of a device of the class immediately above described wherein the alternative positions of the mold may be adjusted while the mold is in a suspended position and with a minimum of time and effort.

A further object of our invention is the provision of a device of the class above described which is relatively inexpensive to produce, which is highly efficient in its operation and which is rugged and durable in construction.

The above and still further objects of our invention will become apparent from the following detailed specification, appended claims and attached drawings.

Referring to the drawings, wherein like characters indicate like parts throughout the several views:

FIG. 1 is a view in end elevation illustrating our invention;

FIG. 2 is a view in side elevation of the structure of FIG. 1; and

FIG. 3 is an enlarged fragmentary view in section as seen substantially from the line 3—3 of FIG. 2.

Referring with greater particularity to the drawings, the numeral 1 identifies a cylindrical mold element, preferably formed from sheet steel and having its opposite marginal edges turned radially outwardly to define continuous annular supporting flanges 2. Snugly received within the cylindrical mold element 1 is a matrix element 3, preferably formed from cast aluminum or the like. Preferably, the matrix element 3 is made up of a plurality of segmental matrix sections 3a in end-to-end relationship so as to form a complete annulus, and its radially inner surface is formed to define a suitable tread pattern, not shown. Each of the sections 3a is suitably secured to the mold section 1 by means not shown.

Wound spirally about the radially outer surface 4 of the mold element 1, intermediate the supporting flanges 2 thereof, is a steam-conducting heating tube 5, the inlet and outlet nipples of which are identified respectively by 6 and 7. Extending axially of the mold element 1 in circumferentially spaced relationship to the inlet-outlet nipples 6, 7, and in diametrically opposed relationship to each other, are a pair of bridge bars 8, opposite ends 9 of which are suitably anchored to the opposed supporting flanges 2, and the intermediate portions of which, as shown in FIG. 3, bridge the convolutions of the heating tube 5.

The intermediate portions of the bars 8 define radially projecting trunnions 10 and diametrically enlarged bearing flanges 11, the annular bearing surfaces 11a of which lie in parallel planes, extending parallel to the axis of the mold element 1. Journalled for rotation on the trunnions 10 are clamping plate elements 12, the annular faces 12a of which are in slidable engagement one each with one of the annular bearing faces 11a of the bearing flanges 11. The radially outer end portions of the trunnions 10 are diametrically reduced, as at 13, and threaded to receive washer-equipped lock nuts 14.

Each of the clamping plate elements 12, in radially outwardly spaced relationship to the respective trunnion 10, is formed to define a segmental slot 15 which extends through substantially 90 degrees of a circular arc concentric with an adjacent trunnion 10. A handle-equipped clamping dog 16 extends through each of the segmental slots 15 with their screw-threaded inner ends 16a having screw-threaded engagement with an aperture 17 in its respective bearing flange 11. An annular diametrically enlarged abutment 18 bears upon each respective clamping plate 12, on opposite sides of the respective slot 15.

Shown as being rigidly secured to the clamping plates 12 and projecting radially outwardly with respect to the trunnions 10 are hook-acting loop elements 19 which are adapted to detachably receive hook elements 20 associated with lifting chains 21, the looped upper ends 21a of which are detachably and selectively receivable within upwardly opening notches b on opposite ends of a lifting tree A associated with a suitable hoist, not shown.

Because of the considerable weight which has been added to the sheet metal mold element 1 by means of the cast matrix element 3, manual lifting for the purpose of transporting said mold element and parts associated therewith to and from storage racks, not shown, and to and from curing presses of the type shown in U.S. Patent 2,034,618 (elements 8, 9 and 10), becomes impractical if not impossible. Consequently, a power hoisting means including the lifting tree A is positioned in overlying relationship to said mold. When the looped upper ends 21a of the chain 21 are received within suitable notches b in the lifting tree A and the hooks 20 are caused to receive each one of the loops 19 carried by the clamping flanges 12, lifting movements of the mold element 1 and parts associated therewith may be achieved, as shown in FIGS. 1 and 2. As therein shown, the mold element 1 is in an upright position with its axis extending horizontally. Such a position is ideal for storing of the mold 1. However, when it is desired to place the mold element 1 in operative position for vulcanizing upon a curing table or press, as shown in U.S. Patent 2,034,618, it is but necessary to release the locking dogs 16 so as to permit relative rotation between the bearing flanges 11 and clamping plates 12 to the full extent of movement of the threaded inner ends 17 of the clamping dogs 16 in the segmental slots 15.

Our invention has been thoroughly tested and found to be completely satisfactory for the accomplishment of the above objects, and while we have shown and described a preferred embodiment, we wish it to be specifically understood that the same is capable of modification without departure from the spirit and scope of the appended claims.

What is claimed is:
1. In a device of the class described,
   (a) a generally cylindrical mold formed to define radially outwardly projecting-circumferentially endless supporting flanges at its marginal edges,
   (b) a steam-conducting heating tube wound spirally about the outer surface of said mold intermediate said flanges,
   (c) a pair of axially extended bridge bars spanning said heating tube at diametrically spaced points and having their opposite ends anchored to said flanges,
   (d) the intermediate portion of said bars defining radially outwardly projecting trunnions and diametrically enlarged bearing flange elements the bearing surfaces of which lie in parallel planes extending axially of said mold,
   (e) clamping plate elements one each journalled on one of said trunnions and having faces in slidable engagement with one of said bearing surfaces,
   (f) a clamping dog having screw-threaded engagement with one of said elements and extending through circumferentially extended slots in the other thereof,
   (g) and hook means carried by the other of said elements.

2. The structure defined in claim 1 in which said mold is formed from sheet metal and in which said clamping dog has screw-threaded engagement with one of said bearing flange elements and said hook means is carried by said clamping plate elements.

References Cited by the Examiner
UNITED STATES PATENTS

| | | | |
|---|---|---|---|
| 1,382,398 | 6/21 | Wildraudt | 18—2 |
| 2,509,240 | 5/50 | Meehan | 214—374 |
| 2,620,218 | 12/52 | Morith | 294—78 |
| 2,838,336 | 6/58 | Archer | 294—78 |
| 2,886,851 | 5/59 | Strickler et al. | 18—38 |
| 2,923,527 | 2/60 | Fannen | 18—18 XR |
| 3,015,130 | 1/62 | Voth | 18—18 |
| 3,091,802 | 6/63 | Rawls | 18—18 |

J. SPENCER OVERHOLSER, *Primary Examiner.*

MICHAEL V. BRINDISI, WILLIAM J. STEPHENSON,
*Examiners.*